April 21, 1925.
W. H. HOWARD
1,534,323
PROCESS OF AND APPARATUS FOR TREATING WASTE SMELTER GASES
Filed Nov. 7, 1922
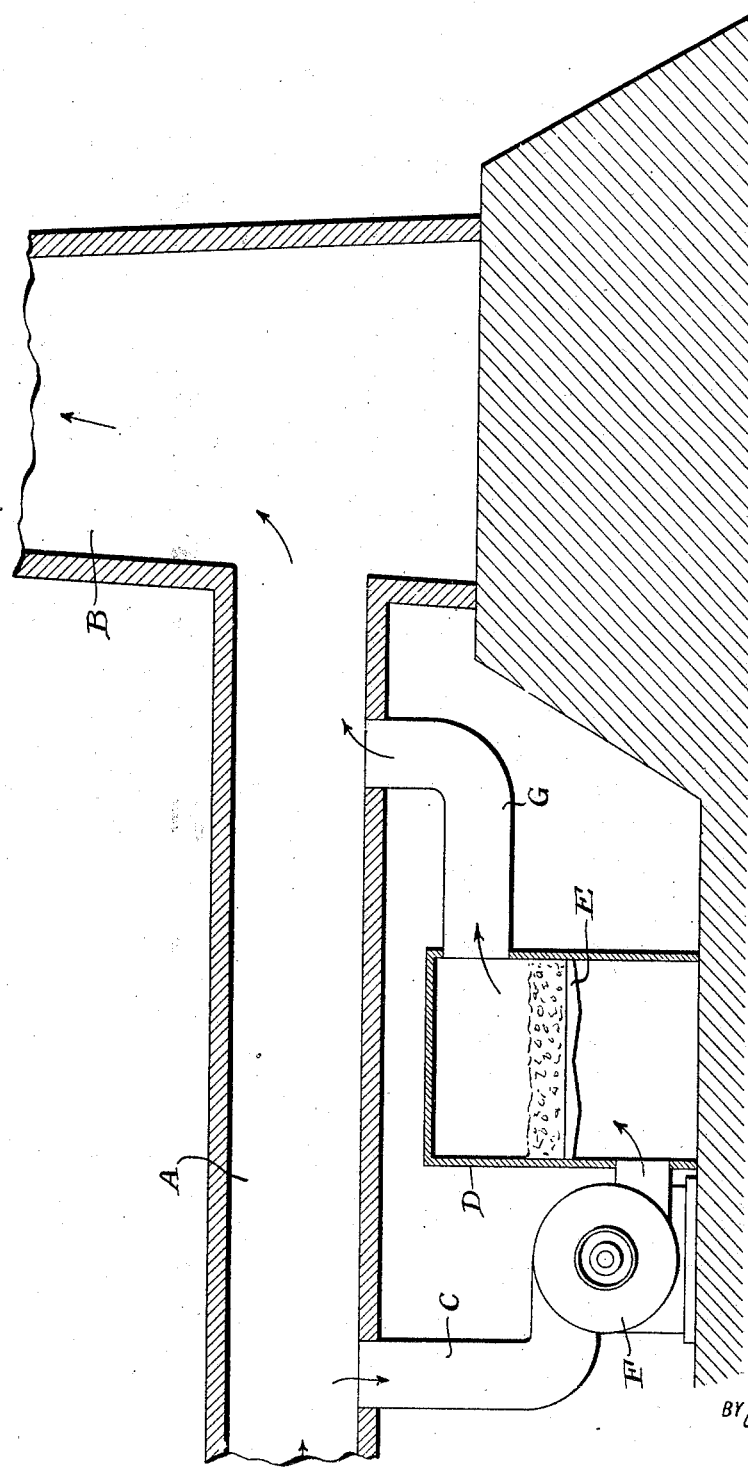
INVENTOR
William H. Howard
BY Albert M. Austin
his ATTORNEY Patented Apr. 21, 1925.

1,534,323

UNITED STATES PATENT OFFICE.

WILLIAM H. HOWARD, OF SALT LAKE CITY, UTAH, ASSIGNOR TO AMERICAN SMELTING AND REFINING COMPANY, OF NEW YORK, N. Y., A CORPORATION OF NEW JERSEY.

PROCESS OF AND APPARATUS FOR TREATING WASTE SMELTER GASES.

Application filed November 7, 1922. Serial No. 599,510.

*To all whom it may concern:*

Be it known that I, WILLIAM H. HOWARD, a citizen of the United States, and resident of Salt Lake City, in the county of Salt Lake and State of Utah, have invented certain new and useful Improvements in Processes of and Apparatus for Treating Waste Smelter Gases, of which the following is a specification.

The invention relates in general to an improvement in the method and apparatus for treating obnoxious smelter gases prior to their discharge into the atmosphere, and relates specifically to improvements in the treatment of such gases so as to neutralize all or a portion of the elements thereof which are deleterious to vegetable and animal life, and to utilize such neutralized gases as a means of facilitating the discharge of the gas from smelting and other metallurgical operations.

It is well known that the gases usually resulting from metallurgical operations, either deprived of solid constituents or not, contain various elements that are harmful to vegetable or animal life, even when found in very small quantities. These percentages are so low that they escape detection except by scientific methods, but the harm resulting has been so extensive and so serious that in the past some furnaces have been obliged to discontinue operations.

In Letters Patent No. 1,422,575, granted to me on July 11, 1922, I disclosed one way of overcoming the harmful character of the discharged gases, which comprises, among other things, a method of causing the discharged gases to ascend high into the air, whereby the obnoxious elements of the discharged gases became so completely and thoroughly diluted before they came into contact with vegetable or animal life that they were practically harmless.

The present invention contemplates a different method of neutralizing the harmful elements of the gases. Broadly, it relates to the decomposition of certain of the harmful elements of the gases before the same have been discharged. Also it relates to the utilization of the products of combustion resulting from this secondary treatment of the gases to aid in the discharge thereof from the stack or chimney of the furnace, thereby further insuring thorough dilution and dispersion of the obnoxious elements in the gases and complete protection of animal and vegetable life from the harmful effects thereof.

The invention more particularly relates to a method of breaking up and converting the molecules of sulphur dioxide which are contained in smelter gases. It is well known that sulphur dioxide is one of the most injurious and harmful elements of smelter gases, and that small quantities thereof, estimated as low as from one to four parts per million in the atmosphere, may under certain conditions cause damage to vegetable and animal life. In carrying out this feature of my invention I propose to subject all or a portion of the smelter gases, after they have passed from the furnace, flue, or treating chamber of any kind, and either immediately before or soon after they have entered the stack or chimney, to the action of a reducing agent which will break up the molecules of sulphur dioxide ($SO_2$) and reduce them to relatively harmless elements and compounds.

The invention further consists in the new and novel features of operation and the new and original arrangements and combinations of steps in the process hereinafter described and more particularly set forth in the claims.

The apparatus employed may be of any suitable character that would cause the necessary reactions to take place, and in the accompanying drawing I have illustrated diagrammatically one simple form of apparatus suitable for this purpose.

Referring to the drawing, the discharge conduit of any type of metallurgical furnace is indicated diagrammatically and may comprise the flue A and the stack or chimney B. Communicating with this conduit is a by-pass conduit C, that leads into an auxiliary heater D, preferably provided with grates E. A fan or blower F may be located in the by-pass that draws the gases from the main flue and forces them through the heater D. The outlet from this secondary heater leads the gases of combustion back into the flue, or directly into the stack, as may be desired.

The stack itself is preferably of the conventional high type usually employed with metallurgical furnaces.

It will be understood that a suitable reducing material, such as coal, or carbonaceous material of any kind, may be supplied to the supplemental heater through suitable openings (not shown). The inlet conduit C enters the heater at any suitable point below the grates and supplies all or a portion of the draft to ignite the carbonaceous material and maintain combustion thereof.

In operation, and employing the particular form of apparatus illustrated in the drawing, a portion of the furnace gases will be withdrawn from the flue by the action of the fan or blower and forced through the incandescent carbon on the grates of the supplemental heater. The sulphur dioxide present will immediately be reduced to elemental sulphur and relatively innocuous carbon dioxide ($CO_2$), probably by the formula:
$$SO_2 + C = CO_2 + S.$$

At the same time the smelter gases passing through the supplemental heater are raised to a higher temperature, and pass into the main flue or stack of the smelter at a point nearer the outlet or nozzle of the flue or stack than the point at which they entered. The heated reduced gases, together with the products of combustion of the heater commingle with any portion of the gases that have not been reduced, thus diluting the noxious elements, and also causing the gases to pass out of the stack with a high nozzle velocity, whereby a column of the discharged gases will be carried high into the air and the harmful ingredients thereof become thoroughly diluted by the surrounding atmosphere before they can come into contact with animal or vegetable life.

It is obvious that a greater or less quantity of the discharging gases from the smelter may be subjected to this secondary or supplemental heating, as may be required by the particular circumstances in each case. Obviously, however, only a sufficient percentage of the total volume of gas need be withdrawn and subjected to heating to neutralize completely the harmful elements that are contained therein. It is also obvious that a portion of the smelter gases may be withdrawn directly from the flue or stack and re-introduced into the flue or stack at a point nearer the nozzle thereof, and that various other changes in the several steps of my process and in its operation and in the form and details of the apparatus illustrated may be made by those skilled in the art without departing from the spirit of the invention.

Having described my invention, I claim:

1. The process of treating waste metallurgical gases while being discharged from a metallurgical furnace, which consists in withdrawing gases from the discharge conduit of the furnace, subjecting such withdrawn gases to the action of a reducing agent, and then returning such gases to the discharge conduit of the furnace.

2. The process of treating metallurgical gases while being discharged from a metallurgical furnace, which consists in withdrawing waste gases from the discharge conduit of the furnace, forcing the same under artificial pressure through a reducing agent heated to a temperature above the normal temperature of the discharging gases, and then returning said heated and reduced gases to the discharge conduit of the furnace.

3. The process of treating waste metallurgical gases while being discharged from a metallurgical furnace, which consists in subjecting a portion of the gases to a reducing agent, thereby to neutralize the obnoxious compounds contained in the gases, and then causing said treated gases to commingle with untreated gases prior to the discharge thereof into the atmosphere.

4. The process of treating smelter gases to neutralize the obnoxious elements contained therein, which consists in raising the temperature of a portion of said gases, simultaneously subjecting the same to a reducing action, then causing said treated portion of the gases to commingle with the main body of the gases, and discharging the same high into the air.

5. The process of treating smelter gases to neutralize the obnoxious elements therein, which consists in removing a portion of the gases from the main body thereof, raising the temperature of said removed portion, simultaneously subjecting the same to a reducing action, and then returning said treated portion into the discharging body of gases at a point removed from the discharge outlet of the stack.

6. The process of treating smelter gases to prevent harm to vegetation, which consists in passing a portion of the gases over a reducing agent to reduce the sulphur dioxide and to increase the temperature of said portion of the gases, and then causing said treated portion of the gases to commingle with the discharging gases prior to their discharge from the stack of the smelter.

7. The process of treating smelter gases, which consists in removing from the current of discharging gases a quantity of said gases, reducing the sulphur dioxide in said removed portion, increasing the temperature of said removed portion of gases, and then causing the same to reenter the current of discharging gases prior to their discharge from the stack of the smelter.

8. The combination of a metallurgical furnace, a gas discharge conduit therefor comprising a stack, a supplemental heater provided with means for receiving a reducing agent, a by-pass between the conduit and the heater, an outlet from the heater to the conduit, and means for forcing a portion of the gases from the conduit into the draft of said heater and forcing all of the products of combustion from said heater into the conduit to commingle with the gases that are discharging through the stack.

9. The combination of a metallurgical furnace, a main discharge conduit for the waste gases from said furnace, a supplemental heater adapted to burn carbonaceous fuel, an inlet by-pass from the conduit to the heater below the fuel, an outlet by-pass from the heater above the fuel to said conduit, and means for forcing a portion of the gases from said main discharge conduit through the fuel in said heater and for delivering all the products of combustion from said heater into the conduit to commingle with the gases contained therein prior to their passage from said conduit.

Signed at Salt Lake City in the county of Salt Lake and State of Utah this 30th day of October A. D. 1922.

WILLIAM H. HOWARD.